United States Patent Office 3,833,565
Patented Sept. 3, 1974

3,833,565
PHENYLANTIMONY BIS(2-PYRIDINETHIOL 1-OXIDE)
John Downing Curry, Oxford, Ohio, assignor to The Procter & Gamble Company, Cincinnati, Ohio
No Drawing. Filed Sept. 29, 1972, Ser. No. 293,633
The portion of the term of the patent subsequent to Aug. 21, 1990, has been disclaimed
Int. Cl. C07d 31/50
U.S. Cl. 260—270                            1 Claim

ABSTRACT OF THE DISCLOSURE

Phenylantimony bis(2-pyridinethiol 1-oxide), a new antibacterial and antifungal compound, and compositions containing same.

BACKGROUND OF THE INVENTION

Field of the Invention

The present invention relates to a new compound, phenylantimony bis(2-pyridinethiol 1-oxide), which can be formed by the reaction of a phenylantimony dihalide and an alkali metal 2-pyridinethiol 1-oxide salt in a suitable solvent such as dimethylformamide. This invention also relates to the use of this compound, which is highly effective against a broad spectrum of bacteria as well as yeast and fungal species, especially when used on the skin, where the compound is fairly substantive, and to compositions, including detergent compositions, containing said compound.

PRIOR ART

My U.S. Pat. 3,753,990, issued Aug. 21, 1973, teaches phenylbismuth bis(2-pyridinethiol 1-oxide) and its antibacterial and antifungal activities; Schroder et al.'s U.S. Pat. 3,321,480 teaches triphenyl tin 2-pyridinethiol 1-oxide.

SUMMARY OF THE INVENTION

Phenylantimony bis(2-pyridinethiol 1-oxide) has the formula:

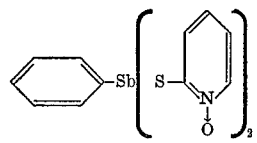

Compositions containing phenylantimony bis(2-pyridinethiol 1-oxide) have excellent broad-spectrum antibacterial and antifungal action.

Phenylantimony bis(2-pyridinethiol 1-oxide), hereinafter referred to as PADP, is a stable white powder having a melting point of about 204–6° C.

Phenylantimony bis(2-pyridinethiol 1-oxide) has been shown to exhibit antibacterial and antifungal effectiveness against, e.g., Gram-positive organisms such as: *Staphylococcus aureus, Sarcina lutea,* and *Streptococcus pyogenes;* Gram-negative organisms such as: *Escherichia coli* and *Pseudomonas aeruginosa;* and fungi (including yeasts and dermatophytes) such as: *Aspergillus niger, Mycrosporum gypseum,* and *Candida albicans.*

Because of the extremely broad antibacterial and antifungal effectiveness of PADP, it is desirably used as a component of surgical scrub products, bar soaps, shampoos, first aid sprays, foot powder, first aid creams, toilet bowl cleaners, hard surface cleaners, detergents, paints, cosmetics, burn dressings, wood preservatives, mildewcides, germicides, fungicides, medicines, packing preservatives, etc. In extremely small amounts, e.g., 100 p.p.m., the PADP will inhibit the growth of a broad variety of organisms. When the PADP is incorporated in larger amounts, the compositions can be used to destroy organisms, as required. For example, in medicine, both for humans and veterinary medicine, the PADP can be used topically to treat a variety of diseases and/or organisms including dandruff and fungus (e.g., athlete's foot). Compositions containing PADP can be used to treat tissue either to prevent infections or to cure infections.

PADP is substantive to cellulose. Thus, it can be used on bandages, diapers, and sanitary napkins to prevent infections, diaper rash, odor, etc. PADP can also be used as a slimicide and preservative for paper and wood.

Preparation of phenylantimony bis(2-pyridinethiol 1-oxide)

Reactions to form phenylantimony bis(2-pyridinethiol 1-oxide) include the reaction of sodium, potassium, ammonium, or lithium 2-pyridinethiol 1-oxide or any other salt containing a loosely held cation with a phenylantimony dihalide (e.g., a chloride, bromide, or iodide).

Compositions containing phenylantimony bis-
(2-pyridinethol 1-oxide)

Phenylantimony bis(2-pyridinethiol 1-oxide) can be used in aqueous and/or non-aqueous solvents to provide antibacterial action. Preferably, the compositions will contain from about 0.2% to about 3% phenylantimony bis(2-pyridinethiol 1-oxide), most preferably from about 1% to about 2%. Desirable compositions are those containing soap and non-soap synthetic detergent compounds. Preferably, the synthetic detergent compounds are cationic, amphoteric, or nonionic.

The term "soap" as used herein is meant to designate alkali metal soaps such as the sodium and potassium salts of the higher fatty acids of naturally occurring plant or animal esters, e.g., palm oil, coconut oil, babassu oil, soybean oil, castor oil, tallow, whale and fish oils, grease and lard and mixtures thereof. Sodium and potassium soaps can be made by direct saponification of the fats and oils or by the neutralization of the fatty acids which are prepared in a separate manufacturing process. Examples of suitable soaps are the sodium, potassium, ammonium and alkylolammonium salts of higher fatty acids ($C_{10}$–$C_{20}$). Particularly useful are the sodium and potassium salts of the mixtures of fatty acids derived from coconut oil and tallow, i.e., sodium or potassium tallow and coconut soap.

Anionic synthetic detergents which can be used with the antibacterial, antifungal, and antiyeast compound of the present invention can be broadly defined as the water-soluble salts, including the alkali metal, ammonium and substituted ammonium salts, of organic sulfuric reaction products having in their molecular structure an alkyl radical containing from about 8 to about 22 carbon atoms and a radical selected from the group consisting of sulfonic acid and sulfuric acid ester radicals.

Important examples of the synthetic detergents which can be used with the compound of the present invention are the following: alkali metal (e.g., sodium and potassium), ammonium and substituted ammonium (e.g., lower alkyl ammonium) salts of the following: alkyl sulfates, especially those obtained by sulfating the higher alcohols produced by reducing the glycerides of tallow or coconut oil; random paraffin sulfonates, in which the alkyl group contains from about 8 to about 22 carbon atoms, prepared by treating random paraffin hydrocarbons in sulfur dioxide and chlorine in the presence of light followed by treating with a base; branched or linear alkyl benzene sulfonates, in which the alkyl group contains from about 8 to about 18 carbon atoms, preferably from about 10 to about 14 carbon atoms, especially those of the types described in U.S. Pat. Nos. 2,220,099, and 2,477,383; sodium alkyl glyceryl ether sulfonates, especially those ethers of the higher alcohols derived from tallow and coconut oil; coconut oil fatty acid monoglyceride sulfates and sulfonates; sulfuric acid esters of the reaction product of one mole of a higher fatty alcohol (e.g., tallow or coconut alcohols) and from about 1 to about 6, preferably about 3 moles of ethylene oxide; alkyl phenol ethylene oxide ether sulfates with about 4 units of ethylene oxide per molecule and in which the alkyl radicals contain about 9 carbon atoms; the reaction product of fatty acids esterified with isethionic acid and neutralized with sodium hydroxide where, for example, the fatty acids are derived from coconut oil; fatty acid amides of methyl taurine in which the fatty acids, for example, are derived from coconut oil; sulfonated olefins of U.S. Pat. No. 3,332,880; and others known in the art, a number being specifically set forth in U.S. Pat. Nos. 2,486,921, 2,486,922 and 2,396,278.

The nonionic synthetic detergents which can be used with the antibacterial compound of the present invention may be broadly defined as compounds produced by the condensation of alkylene oxide groups (hydrophilic in nature) with an organic hydrophobic compound which may be aliphatic or alkyl-aromatic in nature. The length of the hydrophilic or polyoxyalkylene radical which is condensed with any particular hydrophobic group can be readily adjusted to yield a water-soluble compound having the desired degree of balance between hydrophilic and hydropohobic elements.

For example, a well-known class of nonionic synthetic detergents is made available on the market under the trade name of "Pluronic." These compounds are formed by condensing ethylene oxide with a hydrophobic base formed by the condensation of propylene oxide with propylene glycol. The hydrophobic portion of the molecule which, of course, exhibits water insolubility has a molecular weight of from about 1,500 to about 1,800. The addition of polyoxyethylene radicals to this hydrophobic portion tends to increase the water solubility of the molecule as a whole and the liquid character of the products is retained up to the point where polyoxyethylene content is about 50% of the total weight of the condensation product.

Other suitable nonionic synthetic detergents include:

1. The polyethylene oxide condensates of alkyl phenols, e.g., the condensation products of alkyl phenols having an alkyl group containing from about 6 to 12 carbon atoms in either a straight chain or branched chain configuration, with ethylene oxide, the said ethylene oxide being present in amounts equal to 10 to 60 moles of ethylene oxide per mole of alkyl phenol. The alkyl substituent in such compounds may be derived from polymerized propylene, diisobutylene, octane, or nonane, for example.

2. Those derived from the condensation of ethylene oxide with the product resulting from the reaction of propylene oxide and ethylene diamine—products which may be varied in composition depending upon the balance between the hydrophobic and hydrophilic elements which is desired. For example, compounds containing from about 40% to about 80% polyoxyethylene by weight and having a molecular weight of from about 5,000 to about 11,000 resulting from the reaction of ethylene oxide groups with a hydrophobic base constituted by the reaction product of ethylene diamine and excess propylene oxide, said base having a molecular weight of the order of 2,500 to 3,000, are satisfactory.

3. The condensation product of aliphatic alcohols having from 8 to 18 carbon atoms, in either straight chain or branched chain configuration, with ethylene oxide, e.g., a coconut alcohol ethylene oxide condensate having from 10 to 30 moles of ethylene oxide per mole of coconut alcohol, the coconut alcohol fraction having from 10 to 14 carbon atoms.

4. Long chain tertiary amine oxides corresponding to the following general formula, $R_1R_2R_3N \rightarrow O$, wherein $R_1$ contains an alkyl, alkenyl or monohydroxy alkyl radical of from about 8 to about 18 carbon atoms, from 0 to about 10 ethylene oxide moieties, and from 0 to 1 glyceryl moiety, and $R_2$ and $R_3$ contain from 1 to about 3 carbon atoms and from 0 to about 1 hydroxy group, e.g., methyl, ethyl, propyl, hydroxy ethyl, or hydroxy propyl radicals. The arrow in the formula is a conventional representation of a semi-polar bond. Examples of amine oxides suitable for use in this invention include dimethyldodecylamine oxide, oleyldi(2-hydroxyethyl)amine oxide, dimethyloctylamine oxide, dimethyldecylamine oxide, dimethyltetradecylamine oxide, 3,6,9-trioxaheptadecyldiethylamine oxide, di(2-2-hydroxyethyl)tetradecylamine oxide, 2-dodecoxyethyldimethylamine oxide, 3-dodecoxy2-hydroxypropyldi(3-hydroxypropyl)amine oxide, dimethylhexadecylamine oxide.

5. Long chain tertiary phosphine oxides corresponding to the following general formula $RR'R''P \rightarrow O$, wherein R contains an alkyl, alkenyl or monohydroxyalkyl radical ranging from 8 to 18 carbon atoms in chain length, from 0 to about 10 ethylene oxide moieties and from 0 to 1 glyceryl moiety and R' and R'' are each alkyl or monohydroxyalkyl groups containing from 1 to 3 carbon atoms. The arrow in the formula is a conventional representation of a semipolar bond. Examples of suitable phosphine oxides are:

dodecyldimethylphosphine oxide,
tetradecyldimethylphosphine oxide,
tetradecylmethylethylphosphine oxide,
3,6,9-trioxaoctadecyldimethylphosphine oxide,
cetyldimethylphosphine oxide,
3-dodecoxy-2-hydroxypropyldi(2-hydroxyethyl)phosphine oxide,
stearyldimethylphosphine oxide,
cetylethylpropylphosphine oxide,
oleyldiethylphosphine oxide,
dodecyldiethylphosphine oxide,
tetradecyldiethylphosphine oxide,
dodecyldipropylphosphine oxide,
dodecyldi(hydroxymethyl)phosphine oxide,
dodecyldi(2-hydroxyethyl)phosphine oxide,
tetradecylmethyl-2-hydroxypropylphosphine oxide,
oleyldimethylphosphine oxide,
2-hydroxydodecyldimethylphosphine oxide.

6. Long chain dialkyl sulfoxides containing one short chain alkyl or hydroxy alkyl radical of 1 to about 3 carbon atoms (usually methyl) and one long hydrophobic chain which contains alkyl, alkenyl, hydroxy alkyl, or keto alkyl radicals containing from about 8 to about 20 carbon atoms, from 0 to about 10 ethylene oxide moieties and from 0 to 1 glyceryl moiety. Examples include:

octadecyl methyl sulfoxide, 2-ketotridecyl methyl sulfoxide,
3,6,9-trioxaoctadecyl 2-hydroxyethyl sulfoxide,
dodecyl methyl sulfoxide,
oleyl 3-hydroxypropyl sulfoxide,
tetradecyl methyl sulfoxide,
3-methoxytridecyl methyl sulfoxide
3-hydroxytridecyl methyl sulfoxide,
3-hydroxy-4-dodecoxybutyl methyl sulfoxide.

The zwitterionic synthetic detergents useful with the antibacterial agent of the present invention can be broadly described as derivatives of aliphatic quaternary ammonium, phosphonium, and sulfonium compounds, in which the aliphatic radicals can be straight chain or branched, and wherein one of the aliphatic substituents contains from about 8 to 18 carbon atoms and one contains an anionic water solubilizing group, e.g., carboxy, sulfonate, sulfate, phosphate, or phosphonate. A general formula for these compounds is:

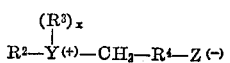

wherein $R^2$ contains an alkyl, alkenyl, or hydroxy alkyl radical of from about 8 to about 18 carbon atoms, from 0 to about 10 ethylene oxide moieties and from 0 to 1 glyceryl moiety; Y is selected from the group consisting of nitrogen, phosphorus, and sulfur atoms; $R^3$ is an alkyl or monohydroxyalkyl group containing 1 to about 3 carbon atoms; x is 1 when Y is a sulfur atom and 2 when Y is a nitrogen or phosphorus atom, $R^4$ is an alkylene or hydroxyalkylene of from 1 to about 4 carbon atoms and Z is a radical selected from the group consisting of carboxylate, sulfonate, sulfate, phosphonate, and phosphate groups.

Examples include:

4-[N,N-di(2-hydroxyethyl)-N-octadecylammonio]-butane-1-carboxylate;
5-[S-3-hydroxypropyl-S-hexadecylsulfonio]-3-hydroxy-pentane-1-sulfate;
3-[P,P-diethyl-P-3,6,9-trioxatetradecoxylphosphonio]-2-hydroxypropane-1-phosphate;
3-[N,N-dipropyl-N-3-dodecoxy-2-hydroxypropyl-ammonio]-propane-1-phosphonate;
3-(N,N-dimethyl-N-hexadecylammonio)propane-1-sulfonate;
3-(N,N-dimethyl-N-hexadecylammonio)-2-hydroxy-propane-1-sulfonate;
4-[N,N-di(2-hydroxyethyl)-N-(2-hydroxydodecyl)-ammonio]-butane-1-carboxylate;
3-[S-ethyl-S-(3-dodecoxy-2-hydroxypropyl)sulfonio]-propane-1-phosphate;
3-[P,P-dimethyl-P-dodecylphosphonio]-propane-1-phosphonate; and
5-[N,N-di(3-hydroxypropyl)-N-hexadecylammonio]2-hydroxypentane-1-sulfate.

The amphoteric synthetic detergents useful in the present invention can be broadly described as derivatives of aliphatic secondary and tertiary amines in which the aliphatic radical can be straight chain or branched and wherein one of the aliphatic substituents contains from about 8 to about 18 carbon atoms and one contains an anionic water solubilizing group, e.g., carboxy, sulfonate, sulfate, phosphate, or phosphonate. Examples of compounds falling within this definition are sodium 3-dodecylaminopropionate, sodium 3-dodecylaminopropane sulfonate, dodecyl-β-alanine, N-alkyltaurines such as the one prepared by reacting dodecylamine with sodium isethionate according to the teaching of U.S. Pat. No. 2,658,072, N-higher alkyl aspartic acids such as those produced according to the teaching of U.S. Pat. No. 2,438,091, and the products sold under the trade name "Miranol" and described in U.S. Pat. No. 2,528,378.

Cationic synthetic detergents include those quaternary ammonium, quaternary phosphonium, and ternary sulfonium compounds containing a single straight chain or branched aliphatic radical containing from about six to about 20 carbon atoms such as dodecyltrimethylammonium chloride; nonylbenzylethyldimethylammonium nitrate; tetradecylpyridinium bromide; octadecylbutylpropylmethylphosphonium nitrite; decyldimethylsulfonium chloride; etc.

Detergent formulations containing the antibacterial compositions of the present invention can also contain from about 0% to about 90%, preferably from about 10% to about 90% of water-soluble alkaline detergency builder salts, either of the organic or inorganic types. Examples of such builder salts can be found in U.S. Pat. No. 3,336,233, issued Aug. 15, 1967, column 9, lines 29–66, which is incorporated herein by reference. However, at a very high pH, the compound may undergo alkaline hydrolysis and accordingly, for long-term stability, the detergent formulations should have a pH of less than about 10 and preferably the pH should be approximately neutral.

The detergent formulations can also contain any of the usual adjuvants, diluents, and additives, for example, perfumes, anti-tarnishing agents, anti-redeposition agents, dyes, fluorescers, suds builders, suds depressors and the like without detracting from the advantageous properties of the antibacterial compositions of the present invention.

Examples of diluents which may be incorporated into a synthetic detergent bar in amounts of up to about 80% of the bar include soaps, especially alkaline earth metal insoluble soaps (alkaline earth salts of higher fatty acids); starches such as cornstarch; and clays such as china clay or fuller's earth. Other diluents include inorganic salts such as sodium and potassium chlorides and sulfates. Such diluents add bulk to the bar and improve its cosmetic properties without impairing its detergent or cohesive properties.

The antibacterial and antifungal efficacy of the phenylantimony bis(2-pyridinethiol 1-oxide) is disclosed in the following examples.

EXAMPLE I

Preparation of phenylantimony bis(2-pyridinethiol 1-oxide)

47.0 g. (.174 mole) of phenylantimony dichloride were dissolved in 200 ml. of dimethylformamide. 53.7 g. (.348 mole, 96.8% active) of sodium pyridinethiol 1-oxide were dissolved in 850 ml. of dimethylformamide. The phenylantimony dichloride solution was then poured into the sodium pyridinethiol 1-oxide solution in a 2000 ml. 3-neck reaction flask equipped with a drying tube and an argon line. The color of the solution changed from dark brown to light yellow as the phenylantimony dichloride solution was added. The solution was stirred at room temperature for one and one-half hours, heated to 65° C. for one hour and filtered while hot. The residue weighed 21.4 g. The theoretical weight of the NaCl produced in the reaction is 20.3 grams. The filtrate (1000 ml.) was extracted with 1000 ml. of dichloromethane and 2000 ml. of water. The lower layer sat overnight. There was no precipitate. The dichloromethane was taken off the next morning on the steam bath (to 300 ml.). 300 ml. of water was then added and the solution was cooled in ice. The solution was then filtered to separate a green crystal residue. This residue was dissolved in dimethyl sulfoxide in the concentration of one gram per 100 ml. at low heat on a steam bath. Then the solution was filtered and two volumes of water were added to the filtrate to precipitate out phenylantimony bis(2-pyridinethiol 1-oxide). The solution was cooled in ice and filtered to give a white residue. The residue was washed with water, air-dried, then washed with ether, and then dried in vacuo to give 48.3 g. (62% yield) of phenylantimony bis(2-pyridinethiol 1-oxide) having a melting point of 204–6° C.

The percents of carbon, hydrogen, nitrogen, antimony, and sulfur present in the phenylantimony bis(2-pyridinethiol 1-oxide) as calculated and found by analysis are:

|    | Calculated | Found |
|----|------------|-------|
| C  | 42.6       | 42.4  |
| H  | 2.9        | 2.9   |
| N  | 6.2        | 6.2   |
| Sb | 14.2       | 14.2  |
| S  | 27.0       | 27.0  |

EXAMPLE II

The phenylantimony bis(2-pyridinethiol 1-oxide) prepared according to the process of Example I was tested for antibacterial efficacy in the following tests:

I. Minimal Inhibitory Concentration (MIC) in Agar 10,000 p.p.m. stock solutions of phenylantimony bis(2-pyridinethiol 1-oxide) were prepared in dimethylformamide (DMF). The active was diluted to the desired test concentration and added to 19–20 ml. of molten trypticase soy agar (TSA) to give a series of graded concentrations (p.p.m.). Thorough rotation of plates assured adequate mixing of the sanitizer before agar solidification. Appropriate control plates containing plain TSA were included. All plates remained at room temperature overnight.

Trypticase soy broth cultures for each test organism (24 hour) were diluted in peptone water to give approximately 100 cells per 0.01 ml. The agar plates, marked in sectors, were inoculated by dropping one drop of each diluted culture from a Kline antigen microdropper onto the appropriate sector of agar. The drops were allowed to dry. The plates were incubated 48 hours at 37° C. and then examined for growth. The weakest concentration which completely inhibited growth of an organism was the MIC. The results for the tests were as follows:

GRAM-POSITIVE ORGANISMS

|  | MIC (p.pm.) |
|---|---|
| *Staphylococcus aureus* (S.a.) | 6 |
| *Streptococcus pyogenes* | 4 |
| *Sarcina lutea* (Sar. l.) | 6 |
| *Pseudomonoas aeruginosa* (Ps. a.) | 100 |
| *Escherichia coli* (E.c.) | 10 |
| *Candida albicans* | 6 |

Fungistatic tests were performed using a modified gradient plate technique reported by Hunt and Sandham (Applied Microbiology 17 #2:329–30, 1969). Results were as follows: *Aspergillus niger*—6.2 p.p.m.; *Microsporum gypseum*—1 p.p.m.

EXAMPLE III.—SHAMPOO COMPOSITIONS

| Composition number | 1 | 2 | 3 |
|---|---|---|---|
| sulfated coconut fatty alcohol-sodium salt | 23 | 23 | |
| Sodium stearate | 8.7 | 8.7 | |
| Sodium alkyl glyceryl ether sulfonate [1] | | | 28.3 |
| Sodium acyl sarcosinate [2] | | | 5.0 |
| Sodium sulfate | 0.8 | 0.8 | 2.6 |
| Sodium chloride | | | 6.6 |
| Trisodium phosphate | 2.1 | 2.1 | |
| Diethanolamide of coconut fatty acids | | | 2.0 |
| Acetylated lanolin | 1.0 | 1.0 | 1.0 |
| Perfume | 1.0 | 1.0 | 0.4 |
| Phenylantimony bis(2-pyridinethiol 1-oxide) | 0.5 | 1.0 | 1.5 |
| Water | | Balance | |
| pH | 7.7 | 7.7 | 7.4 |

[1] Alkyl radicals derived from fatty alcohol, 25.3% from coconut and 3% from tallow.
[2] Acyl radicals derived from coconut fatty acids.

| Composition #4 | Percent |
|---|---|
| Dimethyl coconut [1] amine oxide | 8.0 |
| Disodium lauryl beta-iminodipropionate | 5.0 |
| Sodium coconut [1] sulfate | 4.0 |
| Coconut [2] diethanolamide | 1.0 |
| Phenylantimony bis(2-pyridinethiol 1-oxide) | 1.0 |
| Perfume | 0.0 |
| Color | Less than 0.01 |
| Citric acid to adjust pH to 7.5. | |
| Water | Balance |

[1] The alkyl radical is derived from middle cut coconut alcohol and has approximately the following chain length composition: 2% $C_{10}$, 66% $C_{12}$, 23% $C_{14}$, and 9% $C_{16}$.
[2] Whole cut.

Composition #5

A shampoo composition is obtained by uniformly mixing together the following ingredients:

4% triethanolamine salt of the sulfated condensation product of 3 moles of ethylene oxide and one mole of coconut oil fatty alcohol having the following chain length distribution: 2% $C_{10}$, 66% $C_{12}$, 23% $C_{14}$, and 9% $C_{16}$.

10% triethanolamine N-acyl sarcosinate, the acyl radicals being derived from coconut oil fatty acids and having the following chain length distribution: 10% $C_{8-10}$, 48% $C_{12}$, 21% $C_{14}$, 10% $C_{16}$, and 11% $C_{18}$.

3% monoethanolamide of coconut oil fatty acids having the following chain length distribution: 16% $C_{6-10}$, 48% $C_{12}$, 17% $C_{14}$, 9% $C_{16}$, and 10% $C_{18}$.

1% phenylantimony bis(2-pyridinethiol 1-oxide).

3% diethanolamide of coconut oil fatty acids having the following chain length distribution: 16% $C_{6-10}$, 48% $C_{12}$, 17% $C_{14}$, 9% $C_{16}$, and 10% $C_{18}$.

7% ethanol.

0.75% methyl cellulose, a 2% solution of which has a viscosity of 4000 cps. at 68° F. and a gel point of 140° F.

0.75% perfume.

Balance, water.

Shampoo formulations containing phenylantimony bis-(2-pyridinethiol 1-oxide) are desirable since they will control dandruff.

EXAMPLE IV

Personal Use Detergent Lotion

| Composition #6 | Percent |
|---|---|
| Potassium coconut [1] glyceryl ether sulfonate (about 23% diglyceryl and the balance substantially all monoglyceryl) | 3.0 |
| Sodium coconut [1] glyceryl ether sulfonate (diglyceryl and monoglyceryl content as above) | 4.0 |
| Sodium tallow glyceryl ether sulfonate (diglyceryl and monoglyceryl content as above); the tallow alkyl radicals correspond to those substantially saturated tallow alcohols containing approximately 2%, $C_{14}$, 32% $C_{16}$, and 60% $C_{18}$ | 3.0 |
| Coconut [1] dimethylamine oxide | 5.0 |
| Sodium salt of sulfated condensation product of one mole of nonylphenol with 4 moles ethylene oxide | 2.0 |
| Potassium pyrophosphate | 1.0 |
| Phenylantimony bis(2-pyridinethiol 1-oxide) | 2.0 |
| Sodium chloride (in addition to that from detergents) | 3.0 |
| Sodium toluene sulfonate | 2.5 |
| Sodium carboxymethylcellulose (degree of substitution 0.65–0.95; viscosity of 1% soln., 1000–2800 cps. at 25° C.) | 0.3 |
| Acrylamide polymer (contains 5–10 mole percent acrylic acid radicals; monomer is less than 0.05%; viscosity of a 0.5% soln. is about 10–15 centipoises at 25° C.) | 0.1 |
| Salts (sodium and potassium chloride and sulfate from detergents) | 1.2 |
| Water | Balance |

[1] Coconut indicates alkyl radicals corresponding to those of middle cut coconut fatty alcohol containing approximately 2% $C_{10}$, 66% $C_{12}$, 23% $C_{14}$, and 9% $C_{16}$.

EXAMPLE V

Cream Shampoo

| Composition | Percent |
|---|---|
| Sodium coconut glyceryl ether sulfonate (about 29% diglyceryl and the balance substantially monoglyceryl) | 14.8 |
| Sodium tallow glyceryl ether sulfonate (about 28% diglyceryl and the balance substantially monoglyceryl) | 2.0 |
| Sodium chloride | 6.7 |
| Sodium sulfate | 3.5 |
| Sodium N-lauroyl sarcosinate | 3.0 |
| Phenylantimony bis(2-pyridinethiol 1-oxide) | 2.0 |
| Middle-cut coconut [1] diethanolamine | 0.4 |
| Acetylated lanolin | 1.0 |
| Perfume | 0.4 |
| Water | Balance |

[1] 2% $C_{10}$, 66% $C_{12}$, 23% $C_{14}$, and 9% $C_{16}$.

EXAMPLE VI

A milled toilet detergent bar is prepared in accordance with methods known and used in the art and having the following composition:

| | Percent |
|---|---|
| Sodium alkyl glyceryl ether sulfonate (alkyl group derived from the middle-cut [1] of alcohols obtained by catalytic reduction of coconut oil) | 8.0 |
| Potassium alkyl sulfate (alkyl group derived from the middle-cut [1] of alcohols obtained by catalytic reduction of coconut oil) | 20.0 |
| Magnesium soap of 80.20 tallow: coconut fatty acids | 17.0 |
| Inorganic salts (sodium and potassium chlorides and sulfates) | 32.0 |
| Phenylantimony bis(2-pyridinethiol 1-oxide) | 1.0 |
| Water and minors | Balance to 100 |

[1] Middle-cut coconut alcohols having a chain length distribution substantially as follows: 2% $C_{10}$, 66% $C_{12}$, 23% $C_{14}$ and 9% $C_{16}$.

This bar cleans well and exhibits good odor reducing properties evidencing antibacterial effectiveness. It reduces the number of bacteria on the skin significantly.

EXAMPLE VII

A granular built synthetic detergent composition having the following formulation can be prepared and the antibacterial compositions of the present invention can be incorporated therein.

| | Percent |
|---|---|
| Sodium dodecylbenzene sulfonate | 17.5 |
| Sodium tripolyphosphate | 50.0 |
| Sodium sulfate | 14.0 |
| Sodium silicate ($SiO_2$:$Na_2O$=2:1) | 7.0 |
| Phenylantimony bis(2-pyridinethiol 1-oxide) | 3.0 |
| Water and minors | Balance to 100 |

This composition, in addition to performing well in its cleaning capacity, imparts considerable antibacterial activity to fabrics cleansed in its solution.

Substantially equivalent results are obtained, i.e., good cleaning and good odor reducing properties when the sodium dodecylbenzene sulfonate of Example VII is replaced. on an equal weight basis, by the following:

dodecyltrimethylammonium chloride;
nonylbenzylethyldimethylammonium nitrate;
tetradecylpyridinium bromide;
octadecylbutylpropylmethylphosphonium nitrite;
decyldimethylsulfonium chloride;
(hexylphenyl)dimethylbenzylammonium fluoride;
eicosyldimethylbenzylphosphonium chloride;
coconut alkyl methylmorpholinium nitrate;
octadecylmethylbenzylsulfonium sulfate;
laurylpyridinuim chloride;
laurylpyridinium bromide;
laurylpyridinium bisulfate;
laurylpyridinium-5-chloro-2-mercaptobenzothiazole;
laurylpicolinium-p-toluenesulfonate;
tetradecylpyridinium bromide;
cetylpyridinium chloride;
cetylpyridinium bromide;
laurylisoquinolinium bromide;
laurylisoquinolinium saccharinate;
alkylisoquinolinium bromide;
N-cetyl-N-ethyl-morpholinium ethosulfate;
benzalkonium chloride;
monoquaternaries $R_4N^+X^-$ (one R group is fatty);
octadecyltrimethylammonium chloride;
coconut alkyl trimethylammonium chloride;
dodecylbenzyltri(octyldecyl)ammonium chloride;
monoquaternaries $R_4N^+X^-$ (two R groups are fatty);
dihexadecyldimethylammonium chloride;
di-coconut alkyl dimethylammonium chloride;
monoquaternaries $R_4N^+X^-$ (three R groups are fatty);
tri(hydrogenated tallow) methylammonium chloride;
distilled tallow amine acetate;
diamine acetates;
N-oleyl propylenediamine monoacetate;
sodium tallow alkyl sulfate;
potassium coconut alkyl glyceryl ether sulfonate;
sodium salt of randomly sulfonated paraffin containing an average of 15.2 carbon atoms;
ammonium tridecyl sulfate;
condensation product of octyl phenol with 15 moles of ethylene oxide per mole of octyl phenol;
dimethyldodecylamine oxide;
dodecyldimethylphosphine oxide;
tetradecyl methyl sulfoxide;
3-(N,N-dimethyl-N-hexadecylammonio)propane-1-sulfonate;
3-dodecylaminopropionate; and
dodecyl-β-alanine.

The invention has been described above in conjunction with toilet and laundry detergents. It will be obvious to those skilled in the art, however, that the antibacterial compositions of the present invention can also be beneficially employed in such products as shampoos, foot powders, antiseptic ointments, cosmetic products and the like.

A fabric softening composition having the following formulation can be prepared. The antibacterial and antifungal effectiveness of the phenylantimony bis(2-pyridinethiol 1-oxide) is especially desirable since the antibacterial and antifungal compound is extremely substantive to cloth.

| | Percent |
|---|---|
| Dialkyl dimethylammonium chloride 75% active ingredient dispersed in isopropanol and water, the dialkyl groups being approximately 24% hexadecyl, 75% octadecyl and 1% octadecenyl | 7 |
| The condensation product of 30 moles of ethylene oxide with one mole of coconut alcohol | 3 |
| Color and perfume | 0.3 |
| Phenylantimony bis(2-pyridinethiol 1-oxide) | 1.0 |
| Water | Balance |

What is claimed is:
1. Phenylantimony bis(2-pyridinethiol 1-oxide).

References Cited

UNITED STATES PATENTS

| 3,287,210 | 11/1966 | Leebrick | 260—270 |
| 3,636,213 | 1/1972 | Gerstein et al. | 260—270 |
| 3,753,990 | 8/1973 | Curry | 260—270 |

OTHER REFERENCES

Meinema, Chem. Abstracts, 73: 131094 (1970).

RICHARD J. GALLAGHER, Primary Examiner

U.S. Cl. X.R.

252—106, 107; 260—446; 424—49, 245.

PO-1050
(5/69)

UNITED STATES PATENT OFFICE
CERTIFICATE OF CORRECTION

Patent No. 3,833,565      Dated September 3, 1974

Inventor(s) John Downing Curry

It is certified that error appears in the above-identified patent and that said Letters Patent are hereby corrected as shown below:

Col. 4, line 13, "di(2-2-hydroxyethyl)tetradecylamine oxide" should read --- di(2-hydroxyethyl)tetradecylamine oxide ---.

Col. 4, lines 14 and 15, "3-dodecoxy2-hydroxyproyldi(3-hydroxypropyl)amine oxide" should read --- 3-dodecoxy-2-hydroxypropyldi(3-hydroxypropyl)amine oxide ---.

Col. 7, between lines 19 and 20, below "*Sarcina lutea* (*Sar. l.*) and above "*Pseudomonoas aeruginosa* (*Ps. a.*)", should appear the heading --- GRAM-NEGATIVE ORGANISMS ---.

Col. 7, line 21, "*Pseudomonoas*" should read --- *Pseudomonas* ---

Col. 7, line 55, "0.0" should read --- 0.5 ---.

Col. 8, line 50, "1.2" should read --- 1-2 ---.

Col. 8, line 70, "0.4" should read --- 0.5 ---.

Col. 9, line 12, "80.20" should read --- 80:20 ---.

Signed and sealed this 3rd day of December 1974.

(SEAL)
Attest:

McCOY M. GIBSON JR.
Attesting Officer

C. MARSHALL DANN
Commissioner of Patents.